Figure 1:
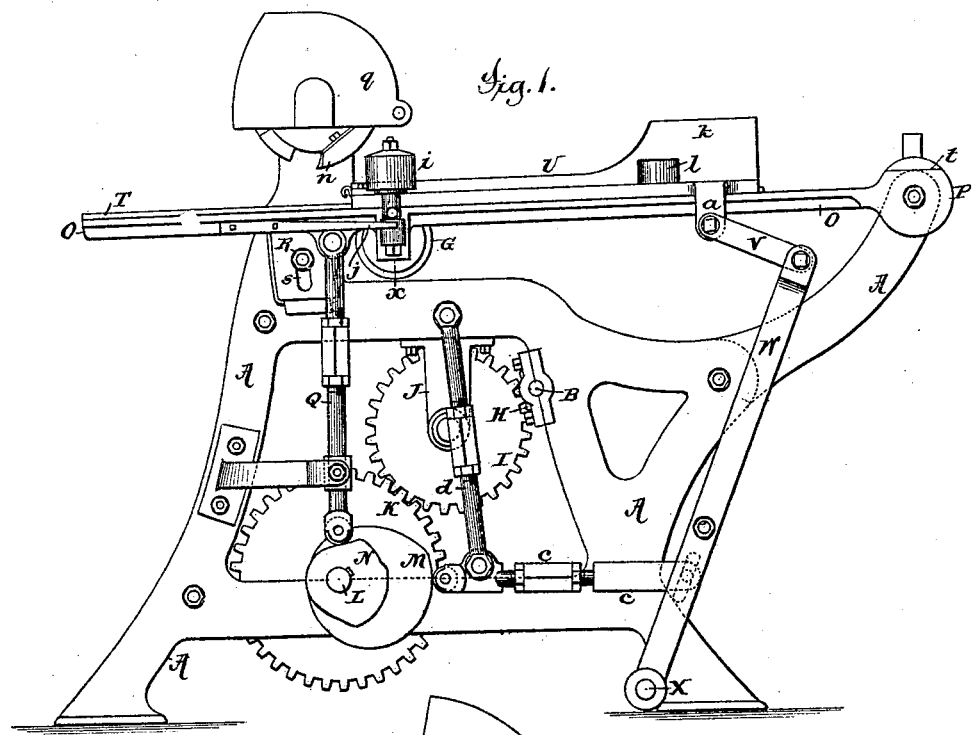

(No Model.) 3 Sheets—Sheet 1.

G. C. AVERY.
MACHINE FOR CUTTING OR DRESSING PLOW HANDLES.

No. 248,550. Patented Oct. 18, 1881.

Attest:
Geo. H. Graham
Jacob Felbel.

Inventor,
Geo. C. Avery
By J. N. McIntire
Atty.

(No Model.) 3 Sheets—Sheet 2.

G. C. AVERY.
MACHINE FOR CUTTING OR DRESSING PLOW HANDLES.

No. 248,550. Patented Oct. 18, 1881.

Attest:
Geo. H. Graham
Jacob Felbel

Inventor,
Geo. C. Avery
By
J. N. McIntire
Atty.

(No Model.) 3 Sheets—Sheet 3.
G. C. AVERY.
MACHINE FOR CUTTING OR DRESSING PLOW HANDLES.
No. 248,550. Patented Oct. 18, 1881.
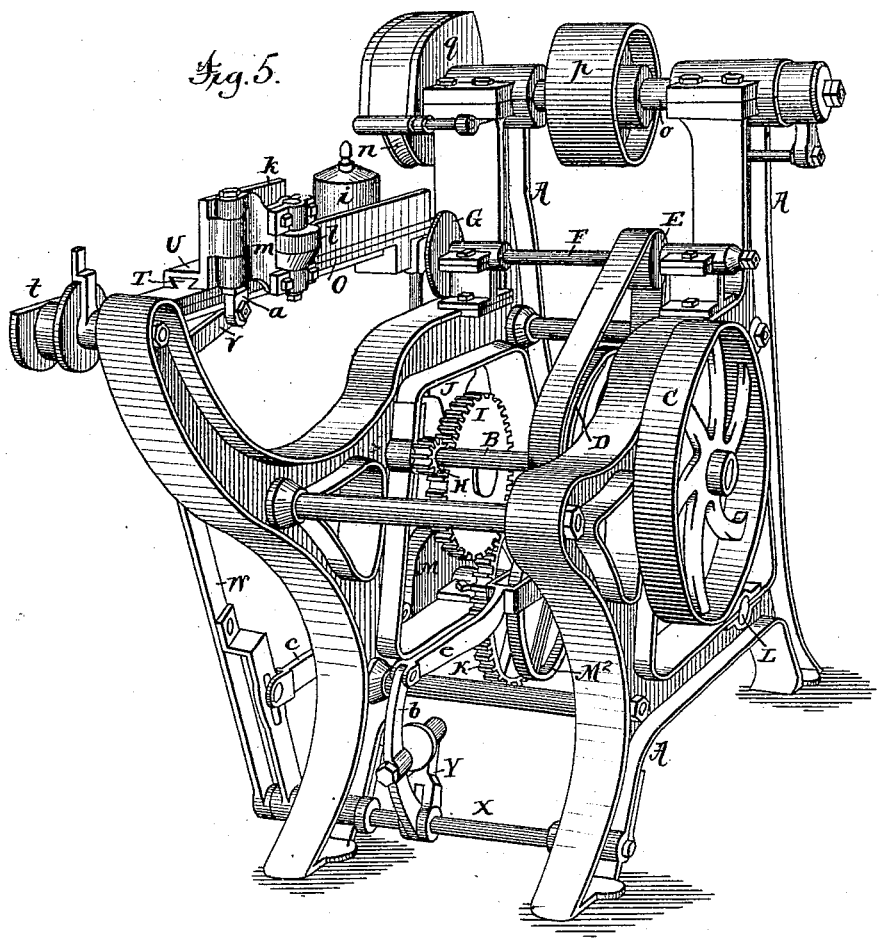

UNITED STATES PATENT OFFICE.

GEORGE C. AVERY, OF LOUISVILLE, KENTUCKY.

MACHINE FOR CUTTING OR DRESSING PLOW-HANDLES.

SPECIFICATION forming part of Letters Patent No. 248,550, dated October 18, 1881.

Application filed June 13, 1881. (No model.)

*To all whom it may concern:*

Be it known that I, GEORGE C. AVERY, of Louisville, in the county of Jefferson and State of Kentucky, have invented a Machine for Cutting or Dressing Plow-Handles; and I do hereby declare that the following is a full and exact description thereof, reference being had to the accompanying drawings, making part of this application.
My invention relates to machinery employed to dress down or cut into shape that part of the wooden bars used for plow-handles which is subsequently bent into the proper shape to complete the hand-pieces, or those portions of the plow-handles which are designed to be grasped by the hands of the plowman.

Previous to my invention machines for the performance of this kind of work have been made with a rapidly-revolving cutter adapted to cut away and thus give shape to the handle end of the bar of wood, (after the usual fashion of wood-cutting machinery,) and in which the wooden bar to be acted on by such cutter has been fed forward beneath the cutter in a proper manner, and then returned therefrom, for the purpose of the discharge or removal from the machine of the cut bar and the insertion of another bar or blank; but in all such machines with which I am familiar the principle of construction and mode of operation have been such that the work could not be done with that rapidity (and at the same time perfection) which is necessary to render a labor-saving machine most useful and durable.
My invention has for its main object to provide for use a machine for doing this kind of work which shall be capable of doing it much more rapidly than, and at the same time with the same degree of perfection as (or better than) machines heretofore made for this purpose; and to this main end and object my invention consists in a machine embodying means for an automatic backward feed of the finished stock at a greater speed than that of the returning supporting bed or carriage on which the stock is supported; and also in a machine embracing certain other novel features of construction, all of which will be hereinafter more fully explained, and more specifically pointed out in the claims of this specification.

To enable those skilled in the art to which my said improvements relate to make and use a machine embodying my invention, I will now proceed to more particularly explain the latter, referring by letters to the accompanying drawings, which form part of this specification, and in which I have illustrated a machine embracing the several features of my invention in those forms in which I have so far successfully carried them out in practice.

Figure 2:
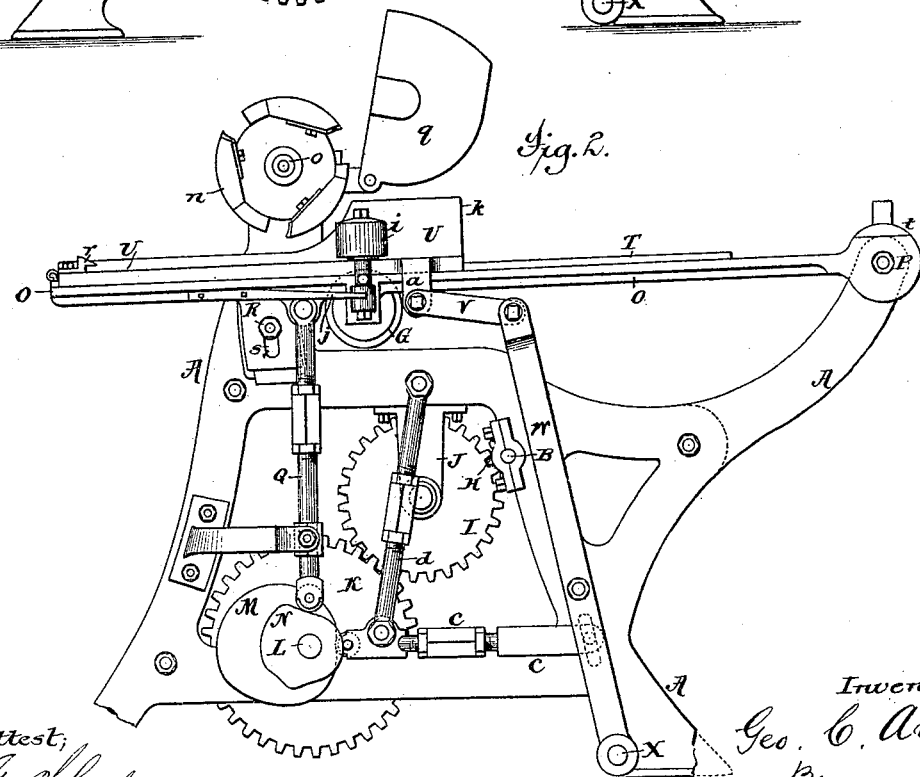
Figure 3:
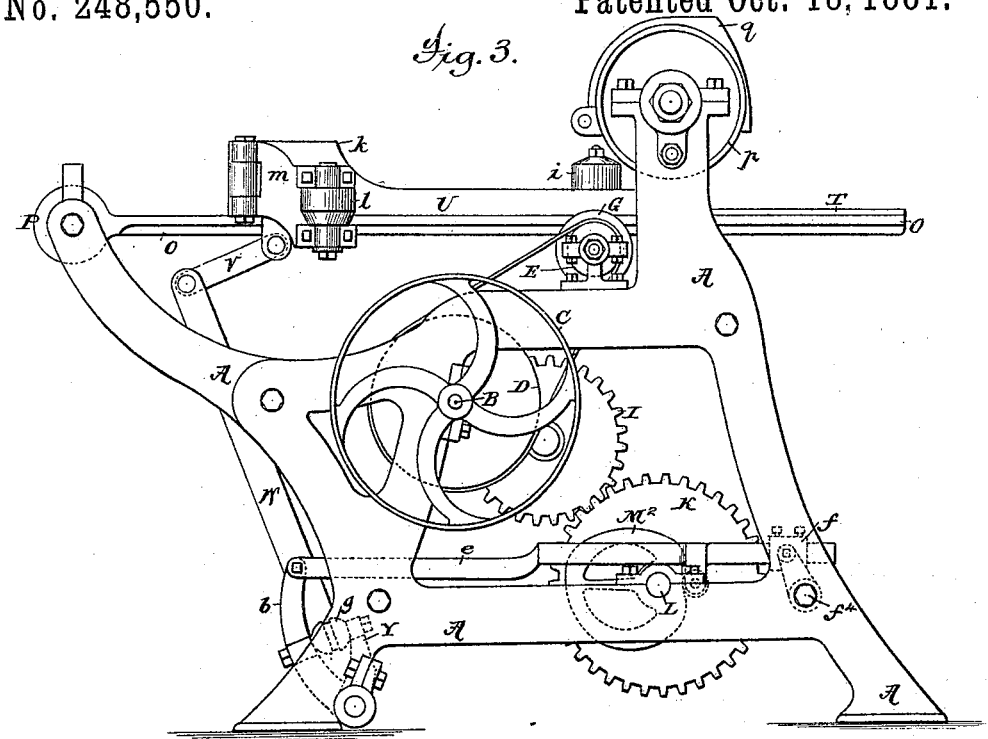
Figure 4:
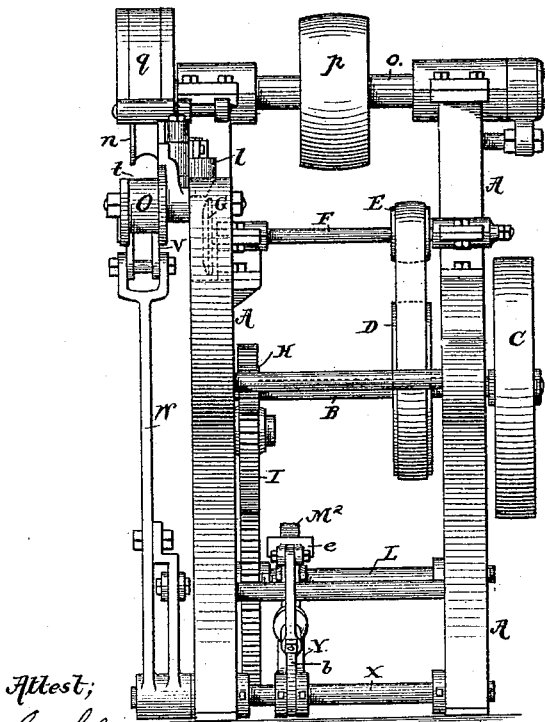
Figure 6:
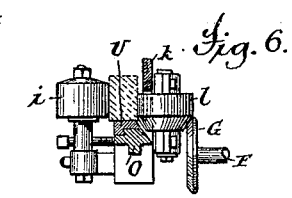
Figure 7:
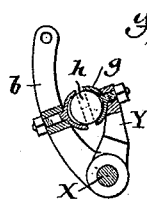

In the accompanying drawings, Figure 1 is a front elevation of the machine with the parts in the relative positions in which they would be at the time of placing in a bar to be cut or shaped. Fig. 2 is a similar view, but with the parts in that relative position in which they would be at a moment after the time when the cutting-tool has performed its work, and when the discharging mechanism is brought into action to rapidly expel the finished bar or blank. Fig. 3 is a back view. Fig. 4 is an end elevation. Fig. 5 is perspective view looking at the rear side and the end, (seen at Fig. 4.) Fig. 6 is a detail cross-section at $x$ $x$, Fig. 2, showing particularly the devices which act on the blank or bar to expel it from the carriage after the performance of the cutting operation. Fig. 7 is a detail view, showing separately the construction of a compensating mechanism hereinafter more particularly explained.

In the several figures the same part will, wherever visible, be found designated by the same letter of reference.

A is the main frame of the machine, in which is mounted, in suitable bearings, the main driving-shaft B, provided at C with a main driving-pulley. On said shaft is secured, also, a smaller pulley, D, which is belted to the pulley E of shaft F, that carries one of the bevel-faced friction-wheels G of the discharging mechanism, while farther along on the same shaft B is keyed a spur-pinion, H, which engages with an intermediate gear, I, (mounted on a suitable stud, journaled in a stand or hanger, J, bolted to the main frame, as shown,) through the medium of which said pinion H drives the spur-gear K of the cam-shaft L. On this cam-shaft L, and outside of its gear K, are secured two face-cams, N and M, the former of which operates to effect the raising and lowering of the work-carriage, (as will be presently explained,) while on the same shaft L, inside of the gear K, is secured a cam, $M^2$, which is a duplicate in shape of the cam M, and co-operates with it to actuate the devices by which the work-carriage is caused to alternately travel back and forth.

O is a vibratory bar or arm, which is pivoted at one end, P, to the main frame, is supported, near its opposite end, by the connecting-rod Q, and is held or guided laterally, near its moving end, by the head of a guide-bolt, R, projecting from the main frame and passing through a curved slot, s, in a flange-like projection of said bar or arm.

On the dovetailing-way T of the arm O is mounted, to slide freely, the carriage U, on which the work or blank to be operated on by the cutter is placed, and by which it is carried forward and subjected to the action of said cutter. This carriage is driven forward and back alternately by the following-named means: To a pendent projection, a, of said carriage is pivoted one end of a link-bar, V, the other end of which is hinged to the upper bifurcated end of a vibratory arm, W, the lower end of which is keyed fast to the outer end of a rock-shaft, X. Near the middle of said shaft X is made fast a clip or short arm, Y, the upper end of which is provided with a compressible or yielding abutment (or compensating device) against which acts an arm, b, that is loosely mounted on shaft X; and by the alternate actions of the said fast arm W and the loose arm b the said rock-shaft X is turned first in one and then in the other direction, and the arm W thus caused (through the medium of its link-like connection V) to move the carriage U back and forth. The arm W is actuated by a push-bar, c, which is pivoted to it at one end, and acted on at the other end by the cam M, said bar c being supported near its free end by a pendent link or connecting-rod, d, (see Fig. 2,) while the arm b is acted upon by a connecting-rod, e, that is pivoted at one end to said arm, is acted on with a pulling strain by the cam M², (around which it is yoked,) and is supported at its free end in a shoe, f, in which it slides, and which is pivoted to the tie-rod f⁴ of the main frame. (See Fig. 3.)

As it is practically very difficult, if not impossible, to construct and set the cams M and M² and have them wear so that the pulling and pushing surfaces of said cams respectively will always act in perfect unison on two rods adapted to respectively rock the shaft X in opposite directions, I have devised and successfully applied the compensating device referred to, and which consists in a cushion or yielding bearing for the loose arm b, mounted on the rigidly-secured clip Y of the rock-shaft.

By reference particularly to the detail view, Fig. 7, it will be seen that a hemispherical cup-like device, g, is formed on or applied to the upper end of the clip Y, and a similar device applied to the arm b, a rubber ball or other spring or cushion, h, being placed between said devices, so that the arm b, in acting on the clip Y to turn the rock-shaft, can act with a slightly-yielding force to compensate for any inequality of action of the two co-operating cams M and M², and other rigidly-connected parts of the carriage-driving mechanism.

By preference, I provide all of the pitmen or connecting-bars with the usual means for varying their lengths to convenience the perfect adjustment of these and other working parts of the machine.

The arm O, preferably near the point at which its vibratory end is supported by the pitman Q, is provided with a small plain-faced anti-friction wheel, i, the spindle of which is mounted to turn freely in a box which is held in its seat (laterally of the said spindle) by a spring, j, (see Fig. 2,) and opposite to this wheel i is located the upwardly-projecting flange k of the traveling carriage U, (see Figs. 1 and 2,) the said flange and wheel operating conjointly to hold in place on the carriage the blank or bar of wood being operated upon.

The wheel i having the described capacity to yield bodily in the direction of the holder-spring j, bars of variable thicknesses can be readily inserted between its periphery and the opposing rigid flange k of the carriage, and the freedom of the wheel i to rotate on its axis enables it to not only permit the easy insertion between itself and the flange k of the stick or bar of wood, but also to perform another and important function in connection with another wheel, l, that is mounted in the traveling carriage, in the following manner, viz: The friction-wheel l is mounted to turn freely on a spindle journaled in a laterally-swinging stand, m, hinged to the inner side of the carriage U, and the flange k of said carriage has an aperture in it of a sufficient size and at the proper place to permit the protrusion slightly through it of the periphery of said wheel l, when the latter, with its spindle and hinged supporting stand m, may be forced in the proper direction. The enforcement of this wheel l partially through the aperture in the flange k is effected in this manner:

When the parts of the machine are in the positions seen at Fig. 2, and the free end of arm O descends, (carrying with it, of course, the carriage U and all its attendants,) the lower beveled portion of the friction-wheel l is brought down into frictional contact with the constantly (and rapidly) revolving friction-wheel G, hereinbefore referred to, whereby a double effect is produced on the said wheel l. In the first place, the downward enforcement of its beveled part against the bevel part of the wheel G causes the wheel l to be forced bodily slightly toward the flange k, so that its periphery will protrude through the aperture in said flange, and in the next place the wheel l will be rotated on its axis in a given direction. The direction of rotation of wheel l and the conjoint action of this rotating wheel (which now bears against one side of the bar of wood on the carriage and forces its opposite side hard against the slightly-yielding idler-wheel i) are such as to cause the blank or bar of wood to travel rapidly backward and be shot out of the machine independent and irrespectively of the motions of the carriage U.

$n$ is the revolving cutter, which may be of about the usual character, and which, as shown, is mounted on the overhanging or projecting end of a shaft, $o$, that is provided with a fast pulley, $p$, to which is applied the belt to drive the said shaft and its cutter at the requisite velocity. Preferably, the shaft $o$, as well as that carrying the driving friction-wheel G of the discharging mechanism, is made adjustable longitudinally in its boxes for the purposes of keeping the working parts in nice adjustment relatively.

$q$ is the usual hinged hood or deflector-cap, adapted to be placed over and partially around the cutter to prevent the flying in all directions of the chips.

After what has already been said, and with the drawings in view, a brief explanation only seems to be necessary of the general operation of the machine.

The bar or stick of wood to be operated upon is placed edgewise on the top of carriage U with its foremost end against the usual stop or dog, $r$, at the forward end of said carriage, and with one side against the flange $k$, the stick, at a point near its front end, being confined laterally between said flange and the yielding presser-wheel $i$, and the rear part of the stick being supported on the usual rest at $t$. The placement in position thus of the stick is done while the parts of the machine are approaching to and are in the position seen at Fig. 1, and as the carriage U is caused to travel forward by the action of the cam $M^2$ on its pulling-bar and the intermediate devices connecting it with the vibratory arm W linked to said carriage, the wooden bar or blank is carried forward beneath the cutter, while at the same time the arm O, on which the carriage is mounted, is so manipulated or moved up and down at its free end by the cam N and the pitman Q as to cause the cutter to give the proper longitudinal profile cut in the wooden bar. The carriage and its contained bar having been advanced to the requisite point to accomplish the proper cutting of the stick, the cam N now permits the free end of arm O to descend so far that the finished work may be withdrawn rearward from beneath the cutter, and so far that the friction-wheel $l$ on the carriage is brought down into forcible contact with the driving friction-wheel G on shaft F, whereby the finished work is run off the carriage backward and rapidly, while said carriage is more slowly reversing its direction of motion and moving back to its originally-described position, by the action of the cam M on its pushbar $c$ and the vibratory arm W. Of course the carriage U, which carries the friction-wheel $l$, must remain at or near the forward end of its stroke long enough to permit this conjoint action of said wheel with the driving friction-wheel G and the coacting wheel or idler $i$, and for this purpose a sufficient portion of each of the cams M and $M^2$ is made concentric with the axis of motion of said cams; but only a very short period of rest is necessary in the carriage, because the rotation of the expelling-wheel $l$ is very rapid, and hence effects the shooting back of the blank without the necessity for any material stoppage of the carriage on which it rests. The quick expulsion thus of the finished blank enables the operator to insert in place another blank or stick during the recession of the carriage and just before it starts again on its forward stroke; and experience has demonstrated that with my improved machine thus operating the work can be done more rapidly and equally well.

Of course many of the details of construction of the devices shown may be varied, and many changes made in the shown combinations and arrangements of the parts, without changing materially the principle of construction and mode of operation of the machine so far as my invention therein is concerned. I do not therefore wish to be understood as limiting my claims of invention to the precise modes shown of carrying out my several improvements, such modes of carrying out the several features of my invention merely being those which I have so far practiced and the best now known to me.

What I claim as new, and desire to secure by Letters Patent, is—

1. In a machine for cutting or dressing plow-handles, a reciprocatory work-carriage carrying mechanism for ejecting therefrom the finished work, substantially as described.

2. The combination of a rotary cutter mounted on a fixed axis of motion, a vibratory bar or arm, and a reciprocating work-carriage sliding longitudinally of said bar or arm, substantially as described.

3. In combination with the cams M and $M^2$, for imparting a vibratory motion to the carriage-driving arm, one of said cams acting directly on said arm and the other acting on said arm indirectly, through the medium of its rock-shaft, a compensating device composed of an arm flexibly connected to the rock-shaft, an arm or clip rigidly secured thereto, and an interposed suitable cushion or yielding abutment, substantially as set forth.

4. In combination with a work-carriage mounted to slide on an arm or support adapted to raise and lower a discharging mechanism composed of a friction-wheel, $l$, mounted in the carriage and adapted to be forced toward the inner side of the work, and an opposing yielding anti-friction wheel, $i$, mounted in the carriage-supporting arm, and a continuously-revolving friction-wheel, G, the combination being such as and operating substantially in the manner set forth.

In testimony whereof I have hereunto set my hand this 28th day of May, 1881.

GEORGE C. AVERY.

In presence of—
HENRY H. McDOUGALL.
CHAS. D. PEARCEY.